(12) United States Patent
Salter et al.

(10) Patent No.: US 11,981,288 B2
(45) Date of Patent: May 14, 2024

(54) ACTIVATING VEHICLE COMPONENTS BASED ON INTENT OF INDIVIDUAL NEAR VEHICLE

(71) Applicant: Ford Global Technologies, LLC, Dearborn, MI (US)

(72) Inventors: Stuart Salter, White Lake, MI (US); Kristopher Brown, Dearborn, MI (US); John Van Wiemeersch, Novi, MI (US); Hussein Berry, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 392 days.

(21) Appl. No.: 17/410,951

(22) Filed: Aug. 24, 2021

(65) Prior Publication Data
US 2023/0061499 A1  Mar. 2, 2023

(51) Int. Cl.
*B60R 25/31* (2013.01)
*B60R 25/01* (2013.01)
(Continued)

(52) U.S. Cl.
CPC .............. *B60R 25/31* (2013.01); *B60R 25/01* (2013.01); *B60R 25/24* (2013.01); *B60R 25/305* (2013.01);
(Continued)

(58) Field of Classification Search
CPC ..... B60R 25/305; B60R 25/24; B60R 25/245; B60R 25/01; B60R 25/31; B60R 25/209;
(Continued)

(56) References Cited

U.S. PATENT DOCUMENTS 10,196,037 B2   2/2019 Nicholls et al.
10,508,485 B2  12/2019 Myers et al.
(Continued)

FOREIGN PATENT DOCUMENTS

CN        204631493 U    9/2015

OTHER PUBLICATIONS

Mark Ormond, "Jaguar Land Rover Opens The Door For Easier Access With Automotive Technology", Jaguar Land Rover Automatic PLC, Dec. 18, 2018, two pages.

*Primary Examiner* — Stephen Holwerda
(74) *Attorney, Agent, or Firm* — Frank Lollo; Eversheds Sutherland (US) LLP

(57) ABSTRACT

This disclosure is generally directed to systems and methods for eliminating false activation of components of a vehicle when the vehicle is parked in a garage. Example components can be a door lock, a door latch, a door activation servo-motor, or a light. In an example method, a vehicle entry authorization system of a vehicle operates a sensor system to obtain dimensional information of an interior portion of the garage. The vehicle entry authorization system may then detect a presence of a mobile device (such as a smartphone, smart device, or a vehicle key fob) and determines the location of the mobile device based on the dimensional information. If the mobile device is located outside the garage, the vehicle entry authorization system refrains from activating a component of the vehicle. However, if the mobile device is located inside the garage, the vehicle entry authorization system activates the component.

18 Claims, 10 Drawing Sheets

(51) Int. Cl.
    *B60R 25/24*     (2013.01)
    *B60R 25/30*     (2013.01)
    *G06V 20/56*     (2022.01)
    *G06V 40/10*     (2022.01)
    *G06V 40/19*     (2022.01)
    *B60R 25/20*     (2013.01)

(52) U.S. Cl.
    CPC .............. *G06V 20/56* (2022.01); *G06V 40/10* (2022.01); *G06V 40/19* (2022.01); *B60R 25/209* (2013.01); *B60R 2325/205* (2013.01)

(58) Field of Classification Search
    CPC .. B60R 2325/205; G06V 40/18; G06V 40/10; G06V 20/56; G06V 40/19
    See application file for complete search history.

(56) References Cited

U.S. PATENT DOCUMENTS

| | | | |
|---|---|---|---|
| 10,812,976 B2 | 10/2020 | Ramic et al. | |
| 2008/0117079 A1* | 5/2008 | Hassan | F02N 11/101 340/901 |
| 2013/0329960 A1* | 12/2013 | Sandahl | G06V 20/56 382/104 |
| 2013/0342672 A1* | 12/2013 | Gray | H04W 12/06 348/78 |
| 2014/0200742 A1* | 7/2014 | Mauti, Jr. | F02N 11/0807 701/2 |
| 2015/0084779 A1* | 3/2015 | Saladin | E05F 15/77 340/686.6 |
| 2016/0176382 A1* | 6/2016 | Siswick | H04L 67/12 701/2 |
| 2016/0264097 A1* | 9/2016 | Oesterling | B60R 25/20 |
| 2017/0234053 A1* | 8/2017 | Myers | E05F 15/73 340/426.15 |
| 2018/0290627 A1* | 10/2018 | Hariri | B60R 25/245 |
| 2019/0001883 A1* | 1/2019 | Singh | G06V 40/19 |
| 2019/0176752 A1* | 6/2019 | Cermak | B60R 25/209 |
| 2019/0215370 A1* | 7/2019 | Granda | H04L 67/12 |
| 2020/0117885 A1* | 4/2020 | Lee | G06V 40/167 |
| 2022/0024413 A1* | 1/2022 | Li | B60R 25/31 |

* cited by examiner

ACTIVATING VEHICLE COMPONENTS BASED ON INTENT OF INDIVIDUAL NEAR VEHICLE

BACKGROUND

Many vehicles now include a sensor system that can detect a driver approaching a vehicle and convey the information to a computer in the vehicle. The computer may then automatically unlock or open the doors of the vehicle after verifying that the driver is authorized to enter the vehicle. However, in some situations, the computer may execute certain operations that are unexpected such as, for example, inadvertently unlocking or opening the doors of the vehicle when a driver does not intend to enter the vehicle. Such actions are inconvenient and can render the vehicle vulnerable to theft and may also lead to unnecessary battery drain.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
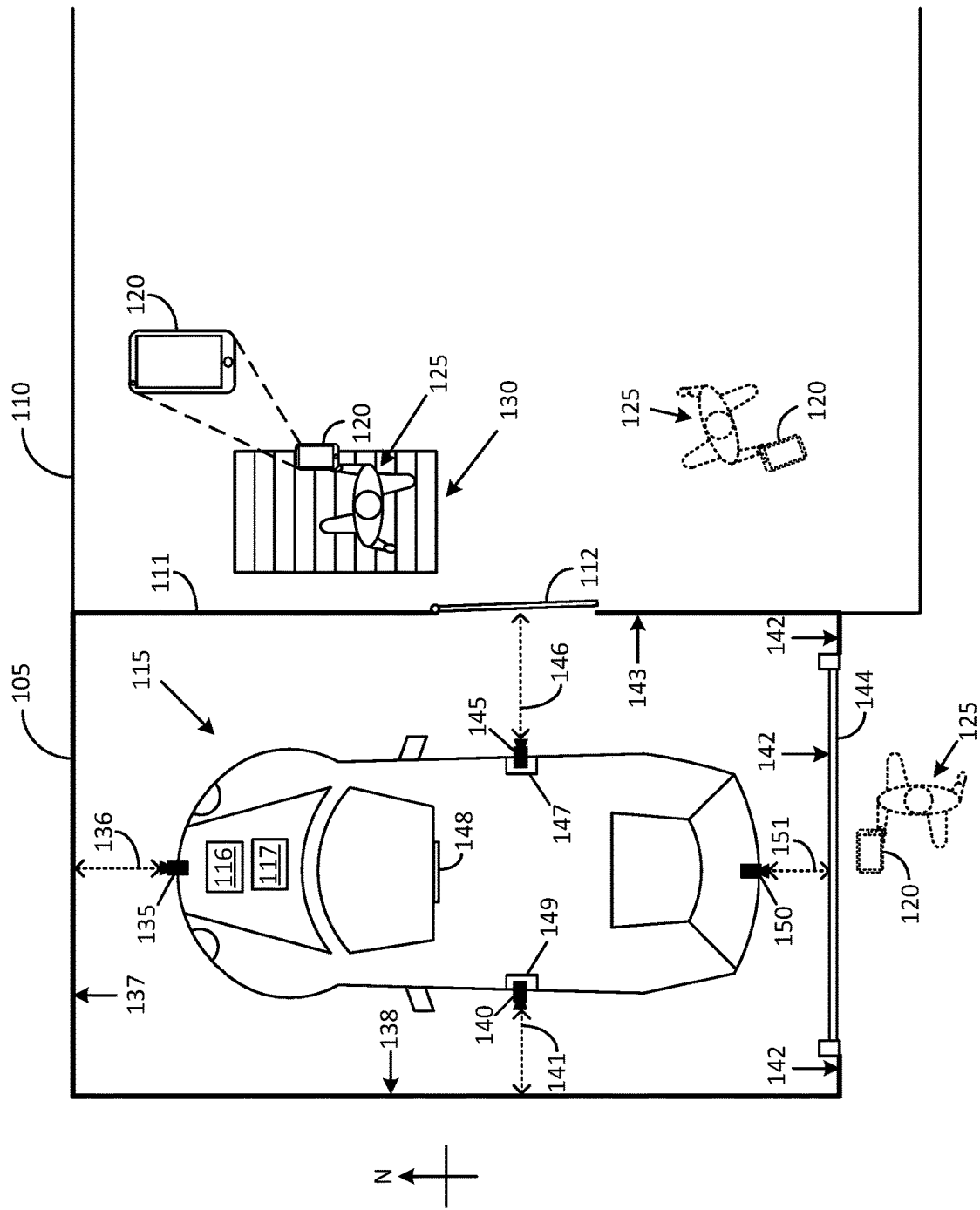
FIG. 1 illustrates a first example scenario where a vehicle that is parked in a garage executes some operations in accordance with the disclosure.

In terms of a general overview, certain embodiments described in this disclosure are directed to systems and methods for eliminating false activation of components of a vehicle when the vehicle is parked in a garage. Example components can be a door lock, a door latch, a door activation servomotor, or a light. In an example method in accordance with the disclosure, a vehicle entry authorization system of a vehicle obtains dimensional information of an interior portion of the garage by operating various devices of a sensor system of the vehicle. The sensor system may include image capture devices (one or more cameras, for example) and may also include distance measurement devices (a radar detector, a light detection and ranging (LIDAR) device, and/or an ultrasonic detector, for example). In an example embodiment, the vehicle entry authorization system operates one or more cameras for capturing images of the walls of the garage and one or more distance measuring devices for obtaining distance information of the walls of the garage with respect to the vehicle. The captured images may then be annotated with the distance information to create a representation of the interior portion of the garage and/or for generating a template.

The vehicle entry authorization system may then detect a presence of a mobile device, such as a smart device or the like (such as, for example, a phone-as-a-key (PaaK) or a vehicle key fob) and identify the location of the smart device. In some instances, the smart device can be a wearable device or the like. The template may be used to determine whether the smart device is located inside or outside the garage. If the smart device is located outside the garage, the vehicle entry authorization system refrains from activating a component of the vehicle. However, if the smart device is located inside the garage, the vehicle entry authorization system activates the component.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, it must be understood that the word "vehicle" as used herein refers to any of various types of transport including, for example, a car, a truck, a van, a sports utility vehicle, a truck, and a bus. The word "sensor" as used herein can refer to any of various types of devices that may be used to perform operations such as identifying the presence of an object, producing an image, generating data, performing a distance measurement, and/or executing a measurement procedure. The word "image" as used herein can refer to a single image or to multiple images. In some cases, the multiple images may be contained in a video clip, which can be a real-time video clip. The phrase "smart device" as used herein generally refers to a mobile device that either operates inherently or can be configured to operate, as a handheld remote-control device. A few examples of a handheld remote-control device include a phone-as-a-key (PaaK) and a vehicle key fob. It must be understood that the phrase "smart device" and "handheld remote-control device" may be used interchangeably herein and either phrase should be interpreted in a broad sense. It must be understood that the description provided herein with reference to a "dwelling" is equally applicable to any type of building structure that can house human beings including, for example, a residence, an office, a workplace, a business, a store, a factory, and a storage facility. Words such as "autonomously" and "automatically" may be used interchangeably herein and are generally directed at indicating actions that are performed by a vehicle without human intervention. The word "adjacent" as used herein encompasses other words such as adjoining, contiguous, abutting, tangent, conterminous and juxtaposed that all indicate close proximity. It must also be understood that words such as "implementation," "application," "scenario," "case," and "situation" as used herein are an abbreviated version of the phrase "In an example ("implementation," "application," "scenario," "case," "approach," and "situation") in accordance with the disclosure." It should be understood that the word "example" as used herein is intended to be non-exclusionary and non-limiting in nature. The phrase "autonomous vehicle" as used in this disclosure generally refers to a vehicle that can perform at least a few operations without human intervention. The Society of Automotive Engineers (SAE) defines six levels of driving automation ranging from Level 0 (fully manual) to Level 5 (fully autonomous). These levels have been adopted by the U.S. Department of Transportation. Level 0 (L0) vehicles are manually controlled vehicles having no driving related automation. Level 1 (L1) vehicles incorporate some features, such as cruise control, but a human driver retains control of most driving and maneuvering operations. Level 2 (L2) vehicles are partially automated with certain driving operations such as steering, braking, and lane control being controlled by a vehicle computer. The driver retains some level of control of the vehicle and may override certain operations executed by the vehicle computer. Level 3 (L3) vehicles provide conditional driving automation but are smarter in terms of having an ability to sense a driving environment and certain driving situations. Level 4 (L4) vehicles can operate in a self-driving mode and include features where the vehicle computer takes control during certain types of equipment failures. The level of human intervention is very low. Level 5 (L5) vehicles are fully autonomous vehicles that do not involve human participation.

FIG. 1 illustrates a first example scenario where a vehicle 115 that is parked in a garage executes some operations in accordance with the disclosure. The vehicle 115 may be any of various types of vehicles such as, for example, a gasoline powered vehicle, an electric vehicle, a hybrid electric vehicle, or an autonomous vehicle, and may include components such as a vehicle entry authorization system 116, a vehicle computer 117, a sensor system, and an infotainment system 148.

The vehicle computer 117 may perform various functions such as controlling engine operations (fuel injection, speed control, emissions control, braking, etc.), managing climate controls (air conditioning, heating etc.), issuing warnings (check engine light, bulb failure, low tire pressure, vehicle in blind spot, etc.), and activating components in accordance with the disclosure (a door lock, a door latch, a door activation servomotor, a light, etc.). The vehicle computer 117 may be communicatively coupled to the vehicle entry authorization system 116 for performing certain operations in response to commands and/or instructions from the vehicle entry authorization system 116. The commands and/or instructions can pertain to operating one or more components of the vehicle 115 in accordance with disclosure.

The sensor system can include various types of sensors, detectors, and imaging devices that provide information about various objects located outside the vehicle 115. The sensors and detectors may be installed at various locations in the vehicle 115 and can include, for example, one or more cameras, ultrasonic detectors, radar detectors, sonar detectors, light detection and ranging (LIDAR) devices, and audio devices (microphones). In the illustrated example, a camera 135 is mounted on a front portion of the vehicle 115 (bumper, grille, dashboard, etc.) and arranged to capture images of objects located in front of the vehicle 115. A camera 150 is mounted on a rear portion of the vehicle 115 (bumper, trunk, etc.) and arranged to capture images of objects located behind the vehicle 115. A camera 140 is mounted on a B-pillar 149 of the vehicle 115 and arranged to capture images of objects located outside on the driver side of the vehicle 115. A camera 145 is mounted on a B-pillar 147 of the vehicle 115 and arranged to capture images of objects located outside on the passenger side of the vehicle 115.

In other embodiments, one or more of these cameras may be complemented with sensors such as, for example, a radar detector, an ultrasonic detector, a sonar detector, and/or a LIDAR device. The various detectors may be arranged for capturing distance information between the vehicle 115 and objects outside the vehicle 115, such as, for example, a wall of the garage 105. In some cases, a microphone may be arranged to capture sounds produced by various objects outside the vehicle 115 such as, for example, a spoken command issued by an individual located outside the vehicle 115.

The infotainment system 148 can be an integrated unit that includes various components such as a radio, a USB access port for digital audio devices, and a global positioning system (GPS). In an example implementation, the infotainment system 148 includes a display incorporating a graphical user interface (GUI) for use by a driver of the vehicle 115. The GUI may be omitted in some implementations, such as, for example, when the vehicle 115 is an autonomous vehicle. The GUI may be used for various purposes such as, for example, to enable a driver of the vehicle 115 to confirm the accuracy of a distance measurement procedure executed by the vehicle entry authorization system 116.

The vehicle entry authorization system 116 can include a computer having a processor and a memory. The memory, which is one example of a non-transitory computer-readable medium, may be used to store various code modules. The code modules, which may be provided in the form of a software package, contain computer-executable instructions that can be executed by the processor for performing various operations in accordance with the disclosure. A few examples of such operations, which are generally directed at eliminating false activation of components of the vehicle 115 when the vehicle 115 is parked in the garage 105, are described below.

The vehicle entry authorization system 116 may further include a communication system that enables the vehicle entry authorization system 116 to communicate with various devices such as, for example, a vehicle entry authorization system of another vehicle, a vehicle computer of another vehicle, and/or a handheld remote-control device 120 of an individual 125 who resides in the dwelling 110. The communication system in the vehicle entry authorization system 116 can employ any of various types of technologies and communication formats such as, for example, Bluetooth®, Ultra-Wideband (UWB), Low Frequency (LF), Ultra-High Frequency (UHF), Wi-Fi, Zigbee®, near-field-communications (NFC), and cellular.

The garage 105 in this example scenario, is attached to a dwelling 110 and has four walls. However, in another scenario, the garage 105 can be an isolated structure that is located adjacent to, and separated from, the dwelling 110 by a separation distance, and/or may have more than, or less than, four walls. The dwelling 110 in this example, which may have more than one floor, includes a wall 111 that is shared with the garage 105. The wall 111 has a door 112 that leads into the garage 105 from a room of the dwelling 110. An individual 125 who may reside in the dwelling (or work in a workplace when the structure is an office, for example) is shown walking up a staircase 130 from one floor to another carrying the handheld remote-control device 120 in one hand.

The handheld remote-control device 120 can be any of various devices such as, for example, a smartphone or a key fob, and can employ any of various communication formats such as Bluetooth®, Ultra-Wideband (UWB), Low Frequency (LF), Ultra-High Frequency (UHF), Wi-Fi, Zigbee®, near-field-communications (NFC), or cellular. More particularly, in accordance with the disclosure, the smartphone can include a software application that enables the individual 125 to use the smartphone for performing certain operations upon the vehicle 115. Such operations can include, for example, starting the vehicle 115 prior to entering the vehicle 115, activating a climate control system of the vehicle 115 prior to entering the vehicle 115, and so on. In an example scenario, the software application may be downloaded into the smartphone and executed in order to convert the smartphone into a Phone-as-a-Key (PaaK). The PaaK provides functionalities such as those offered by a remote-control key fob (unlocking and/or locking a door of a vehicle while located outside the vehicle, activating a security system, starting the vehicle, etc.).

In addition to operations that may be performed by the individual 125, some operations may be performed autonomously by the vehicle entry authorization system 116 without involvement of the individual 125. For example, the vehicle entry authorization system 116 may automatically unlock a door of the vehicle 115 upon detecting the presence of the handheld remote-control device 120 as the individual 125 approaches the vehicle 115. In other examples, the vehicle entry authorization system 116 may detect the presence of the handheld remote-control device 120 in the vicinity of the vehicle 115 and perform actions such as automatically operating a door activation servomotor to open a door, flash one or more exterior lights (head lights, running lights, tail lights, etc.), turn on an interior cabin light, emit a short beep, and/or lower a chassis of the vehicle 115. Lowering the chassis of the vehicle 115 may assist the individual 125 step into the vehicle 115, particularly when the vehicle 115 is a large vehicle such as a truck or a sports utility vehicle.

In some cases, the vehicle entry authorization system 116 may perform some of these autonomous operations under circumstances where it is unexpected or unnecessary to do so. More particularly, the vehicle entry authorization system 116 may perform some of these autonomous operations when the individual 125 is located outside the garage 105 and does not intend to enter the vehicle 115. For example, the vehicle entry authorization system 116 may detect the presence of the handheld remote-control device 120 inside the dwelling 110 when, for example, the individual 125 is climbing the staircase 130 or is moving around the dwelling 110 (as indicated by a dashed line outline), and perform actions such as automatically operating a door activation servomotor to open a door. In another example situation, the individual 125 may be located outside the garage door 144 (as indicated by another dashed line outline) performing some chores on a driveway, for example, and has no intention to enter the vehicle 115 at this time.

In some cases, the actions performed by the vehicle entry authorization system 116, which may be referred to herein as false activations, may be repeated several times when the individual 125 is moving around outside the garage 105 and/or inside the dwelling 110, and may lead to a feature shutoff condition. The feature shutoff condition may hinder desirable actions such as, for example, automatically operating a door activation servomotor to open a door, when the individual 125 actually intends to enter the vehicle 115 later on. Repeated operations of this nature can also lead to unnecessarily draining a battery of the vehicle 115 and/or a battery in the handheld remote-control device 120. It is therefore desirable in accordance with the disclosure to eliminate these types of false activations when the vehicle 115 is parked in the garage 105.

Towards this end, the vehicle entry authorization system 116 may perform a measurement procedure to obtain dimensional information of the interior portion of the garage and may use the dimensional information to refrain from automatically activating a component of the vehicle 115 (light, door, etc.) when the individual 125 is located outside the garage 105. The dimensional information may be further used by the vehicle entry authorization system 116 to perform desirable actions when the individual 125 is inside the garage 105 and intends to enter the vehicle 115.

In an example measurement procedure in accordance with the disclosure, the vehicle entry authorization system 116 operates one or more devices such as, for example, one or more cameras and one or more distance measurement devices (radar detectors, ultrasonic detectors, etc.). More particularly, the vehicle entry authorization system 116 can operate the camera 135 for capturing an image of the wall 137 that constitutes a north perimeter of the interior portion of the garage 105. A distance measurement device, which may be mounted adjacent to the camera 145 on the B-pillar 147, can be operated to determine a distance 136 between the vehicle 115 and the wall 137. The image of the wall 137 may then be annotated with the distance 136.

Similarly, the camera 140 can be operated for capturing an image of the wall 138 that constitutes a west perimeter of the interior portion of the garage 105. A distance measurement device, which may be mounted adjacent to the camera 140 on the B-pillar 149, can be operated to determine a distance 141 between the vehicle 115 and the wall 138. The image of the wall 138 may then be annotated with the distance 141.

The camera 150 can be operated for capturing an image of the wall 142 and an inside surface of a garage door 144, which constitute a south perimeter of the interior portion of the garage 105. A distance measurement device, which may be mounted adjacent to the camera 150, can be operated to determine a distance 151 between the vehicle 115 and the inside surface of the garage door 144. The image of the wall 142 and the inside surface of the garage door 144 may then be annotated with the distance 151.

The camera 145 can be operated for capturing an image of the wall 143 that constitutes an east perimeter of the interior portion of the garage 105. A distance measurement device, which may be mounted adjacent to the camera 145 on the B-pillar 147, can be operated to determine a distance 146 between the vehicle 115 and the wall 143. The image of the wall 143 may then be annotated with the distance 146.

In an example embodiment, the vehicle entry authorization system 116 may stitch together the annotated images of the wall 137, the wall 138, the wall 142, the inside surface of the garage door 144, and the wall 143 to characterize the interior portion of the garage 105 in a format that provides a 3600 view of the walls of the garage 105.

In another example embodiment, the vehicle entry authorization system 116 may generate a template by combining the annotated images of the wall 137, the wall 138, the wall 142, the inside surface of the garage door 144, and the wall 143. The template can be provided in the form of an outline diagram that depicts a perimeter of the interior portion of the garage 105 and may be stored in a database of the vehicle entry authorization system 116 in the form of location coordinates (GPS location coordinates, for example). Dimensions of the outline diagram may be determined by the vehicle entry authorization system 116 by combining the various measurements made by use of the various devices (camera, ultrasonic detector, etc,) mounted on peripheral portions of the vehicle 115 (B-pillar 147, B-pillar 149, trunk, and hood, for example) with dimensional information of the vehicle 115 (end-to-end width, end-to-end length, etc.). The dimensional information may correspond to dimensions applicable to the vehicle 115 during manufacture in a factory. The template can be used by the vehicle entry authorization system 116 to determine whether a device, such as, for example, a PaaK or a vehicle key fob, is either located inside the garage 105 or outside the garage 105. In an example embodiment, the template is stored in a database of the vehicle entry authorization system 116 along with location information of the garage (GPS coordinates, for example). The template may be accessed by, or provided to, other vehicles for use by the other vehicles. The other vehicles may, or may not, be equipped with measurement devices such as, for example, a camera or an ultrasonic detector.

In another example embodiment, the vehicle entry authorization system 116 may combine the annotated images of the wall 137, the wall 138, the wall 142, the inside surface of the garage door 144, and the wall 143 to generate a visual rendering (a diagram, an outline drawing, a graphical image, etc.) that is displayable on the GUI of the infotainment system 148 for various purposes. In one case, the vehicle entry authorization system 116 may display the visual rendering along with a query seeking confirmation of the accuracy of the dimensions and/or shape of the garage 105 as shown in the visual rendering. The driver of the vehicle 115 may observe the visual rendering and either edit the visual rendering (if any dimension is inaccurate, for example) and/or may ratify the accuracy of the rendering.

The example measurement procedure described above (image capture, distance measurement, annotation, etc.) may be executed as a one-time operation or may be executed multiple times (sporadically, periodically, or randomly). The one-time operation may be carried out due to various reasons such as, for example, when the vehicle 115 is being parked in the garage 105 for a first time, when one or more dimensions of the garage 105 has changed (due to remodeling, for example), and/or because of parking of an additional vehicle in the garage 105. The measurement procedure may be carried out multiple times for various reasons such as, for example, to confirm previous measurements, to detect any changes in the dimensions of the garage 105, and/or for applying statistical evaluation procedures upon multiple measurement results. The multiple measurement results may vary in accordance with where and how the vehicle 115 is parked in the garage 105 each time (for example, how far from the wall 137, at what angle with respect to the wall 138, etc.) and the statistical evaluation procedures may be directed at determining average values, determining variances, etc.

In another example embodiment, the vehicle entry authorization system 116 may cooperate with a smartphone (the handheld remote-control device 120) to execute a measurement procedure. The measurement procedure may involve an individual (such as, for example, the driver of the vehicle 115) placing the smartphone upon a first wall (for example, the wall 137) and the vehicle entry authorization system 116 determining a distance between the vehicle 115 and the wall by identifying a location of the smartphone using various location identification procedures. In an example location identification procedure, the location of the smartphone may be determined using UWB-based triangulation when the smartphone uses UWB communications. In another location identification procedure, the location of the smartphone may be determined on the basis of a received signal strength indication (RSSI) and/or a radiation pattern of an antenna of the handheld remote-control device 120.

The distance measuring procedure based on the location of the smartphone can be repeated for each of the other walls of the garage 105 and the measurement results used for generating a template of the garage 105, a 360° view of the walls of the garage 105, and/or a visual rendering of the garage 105. The vehicle entry authorization system 116 may then use the template to determine whether the handheld remote-control device 120 is located inside or outside the garage 105.

In the scenario illustrated in FIG. 1, the handheld remote-control device 120 is located outside the garage 105 (in the dwelling 110 or on the driveway outside the garage 105 door, for example) and the vehicle entry authorization system 116 will refrain from automatically activating a component of the vehicle 115 such as, for example, a door lock, a door latch, a door activation servomotor, or a light. Doing so, eliminates false activations and conserves battery charge in the battery of the vehicle 115.

Figure 2:
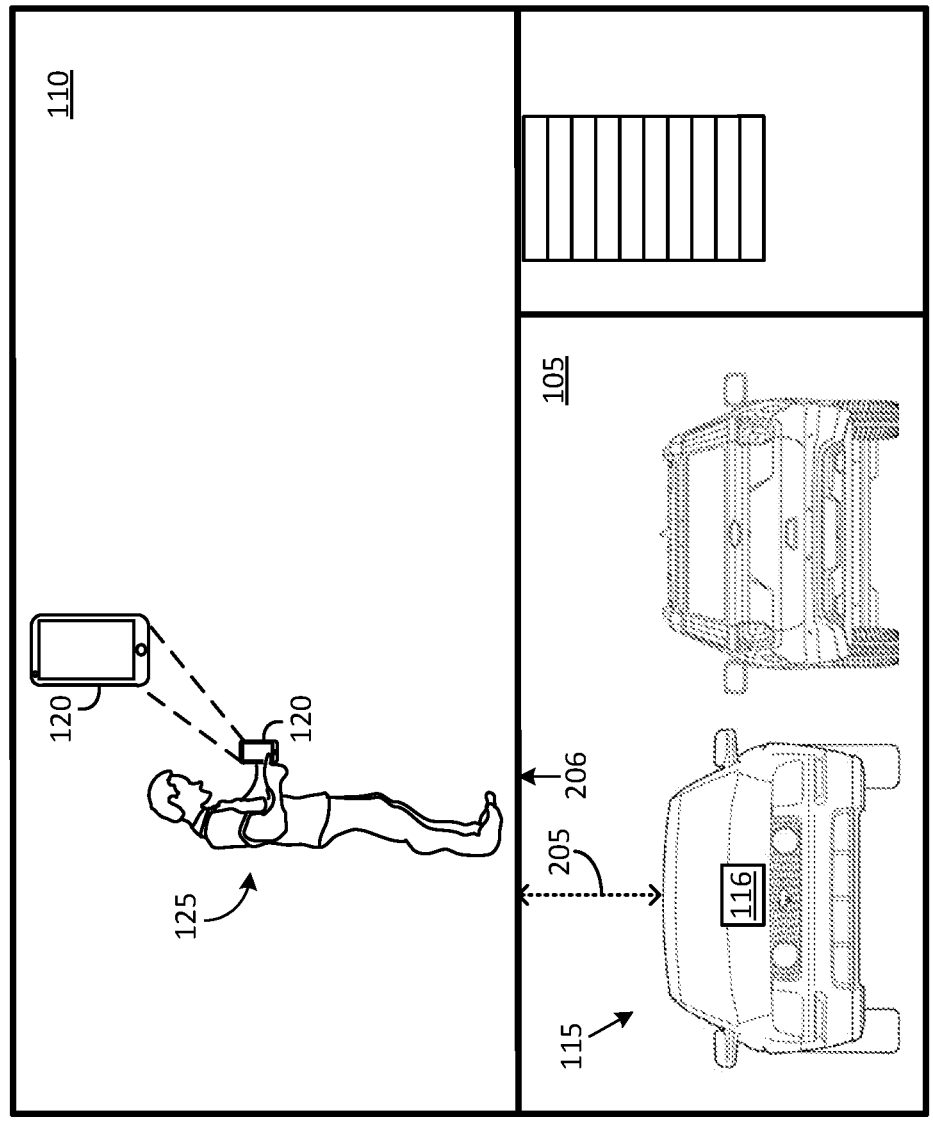
FIG. 2 illustrates a second example scenario where a vehicle that is parked in a garage executes some operations in accordance with the disclosure.

FIG. 2 illustrates a second example scenario where the vehicle 115 is parked in a second type of garage and executes some operations in accordance with the disclosure. In this scenario, the garage 105 is located below a room of the dwelling 110 and obtaining dimensional information of the interior portion of the garage 105 entails executing a measurement procedure that involves determining a distance between a roof the vehicle 115 and a ceiling 206 of the garage 105.

In an example measurement procedure in accordance with the procedure, the vehicle entry authorization system 116 may configure a camera (not shown) that is mounted on the roof of the vehicle 115 to capture an image of the ceiling 206 of the garage 105. A distance measurement device, which may be mounted adjacent to the camera, can be operated to determine a distance 205 between the ceiling 206 of the garage 105 and the roof of the vehicle 115. The image of the ceiling 206 may then be annotated with the distance 205 and used by the vehicle entry authorization system 116 to produce a second example representation of the interior portion of the garage 105. The second example representation may be based exclusively on the image of the ceiling 206 that is annotated with the distance 205 (if no other room of the dwelling 110 is located on the ground floor along with the garage 105) or may be combined with the annotated images of the wall 137, the wall 138, the wall 142, the inside surface of the garage door 144, and the wall 143 if another room of the dwelling 110 is located at ground level and adjacent to the garage 105 (in addition to the room above the garage 105).

In the illustrated scenario, the vehicle entry authorization system 116 may detect the location of the handheld remote-control device 120 and use the dimensional information template to identify the location as being outside the garage 105 (in the room above the garage 105). In this situation, the vehicle entry authorization system 116 will refrain from automatically activating a component of the vehicle 115 such as, for example, a door lock, a door latch, a door activation servomotor, or a light. Doing so, eliminates false activations and conserves battery charge in the battery of the vehicle 115.

Figure 3:
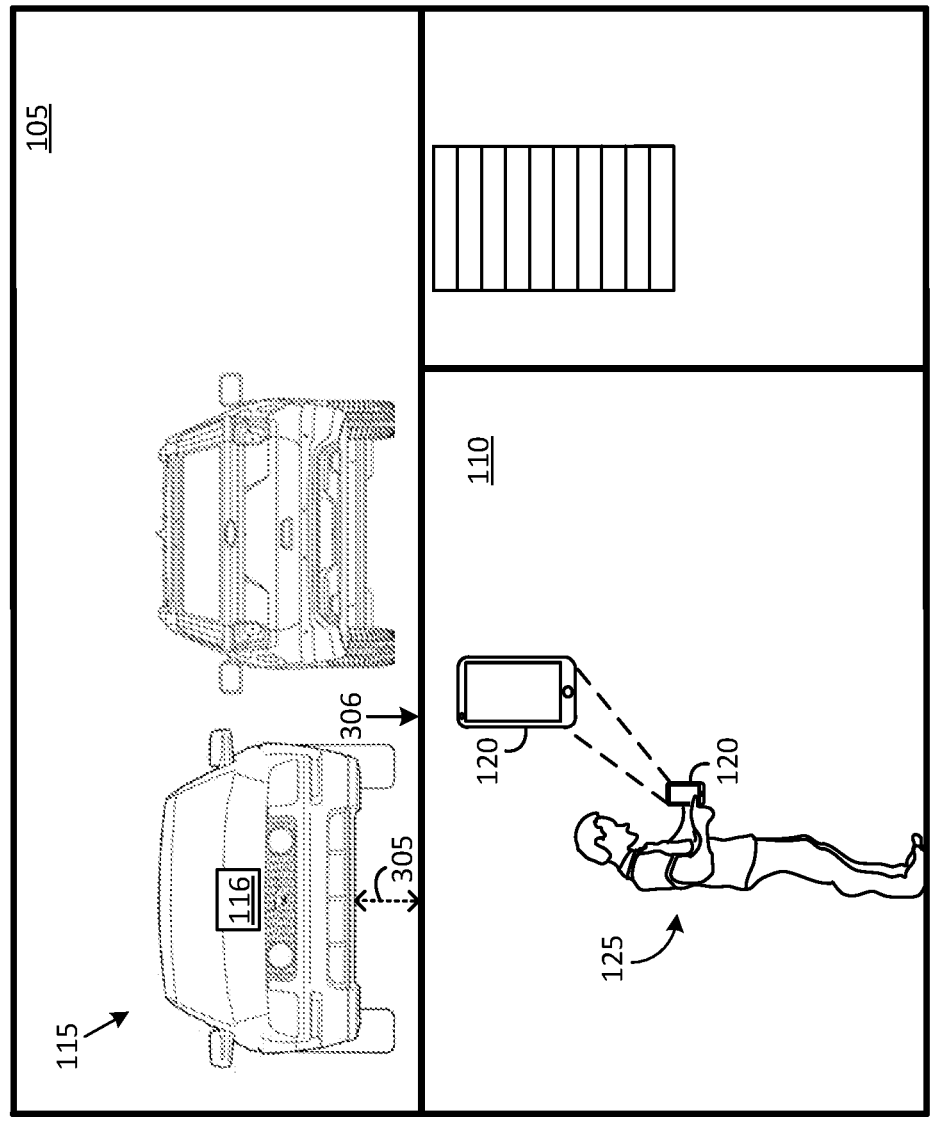
FIG. 3 illustrates a third scenario where a vehicle that is parked in a garage executes some operations in accordance with the disclosure.

FIG. 3 illustrates a third example scenario where the vehicle 115 is parked in a third type of garage and executes some operations in accordance with the disclosure. In this scenario, the garage 105 is located above a room of the dwelling 110 such as, for example, above a basement. Obtaining dimensional information of the interior portion of the garage 105 entails executing a measurement procedure that involves determining a distance between a floorboard of the vehicle 115 and a floor 306 of the garage 105.

In an example measurement procedure in accordance with the procedure, vehicle entry authorization system 116 may determine a distance 305 between the floorboard of the vehicle 115 and a floor 306 of the garage 105. The distance 305 may be determined in various ways. In a first approach, a distance measurement device, which may be mounted adjacent to the camera, can be operated by the vehicle entry authorization system 116 to determine the distance 305. The vehicle entry authorization system 116 may also activate a camera (not shown) that is mounted on the underside of the floorboard of the vehicle 115 to capture an image of the floor 306. The image of the floor 306 may be annotated with the distance 305 and used by the vehicle entry authorization system 116. In a second approach, the vehicle entry authorization system 116 may identify the distance 305 by obtaining vehicle data from a manufacturer's database such as for example, a ground clearance specification of the vehicle 115.

The distance 305 may be used by the vehicle entry authorization system 116 to produce a third example representation of the interior portion of the garage 105. The third example representation may be based exclusively on the distance 305 if no other room of the dwelling 110 is located on the ground floor along with the garage 105 or may be combined with the annotated images of the wall 137, the wall 138, the wall 142, the inside surface of the garage door 144, and the wall 143 of another room of the dwelling 110 is located at ground level and adjacent to the garage 105 (in addition to the room below the garage 105).

In the illustrated scenario, the vehicle entry authorization system 116 may detect the location of the handheld remote-control device 120 and use the dimensional information template to identify the location as being outside the garage 105 (in the room below the garage). In this situation, the vehicle entry authorization system 116 will refrain from automatically activating a component of the vehicle 115 such as, for example, a door lock, a door latch, a door activation servomotor, or a light. Doing so, eliminates false activations and conserves battery charge in the battery of the vehicle 115.

Figure 4:
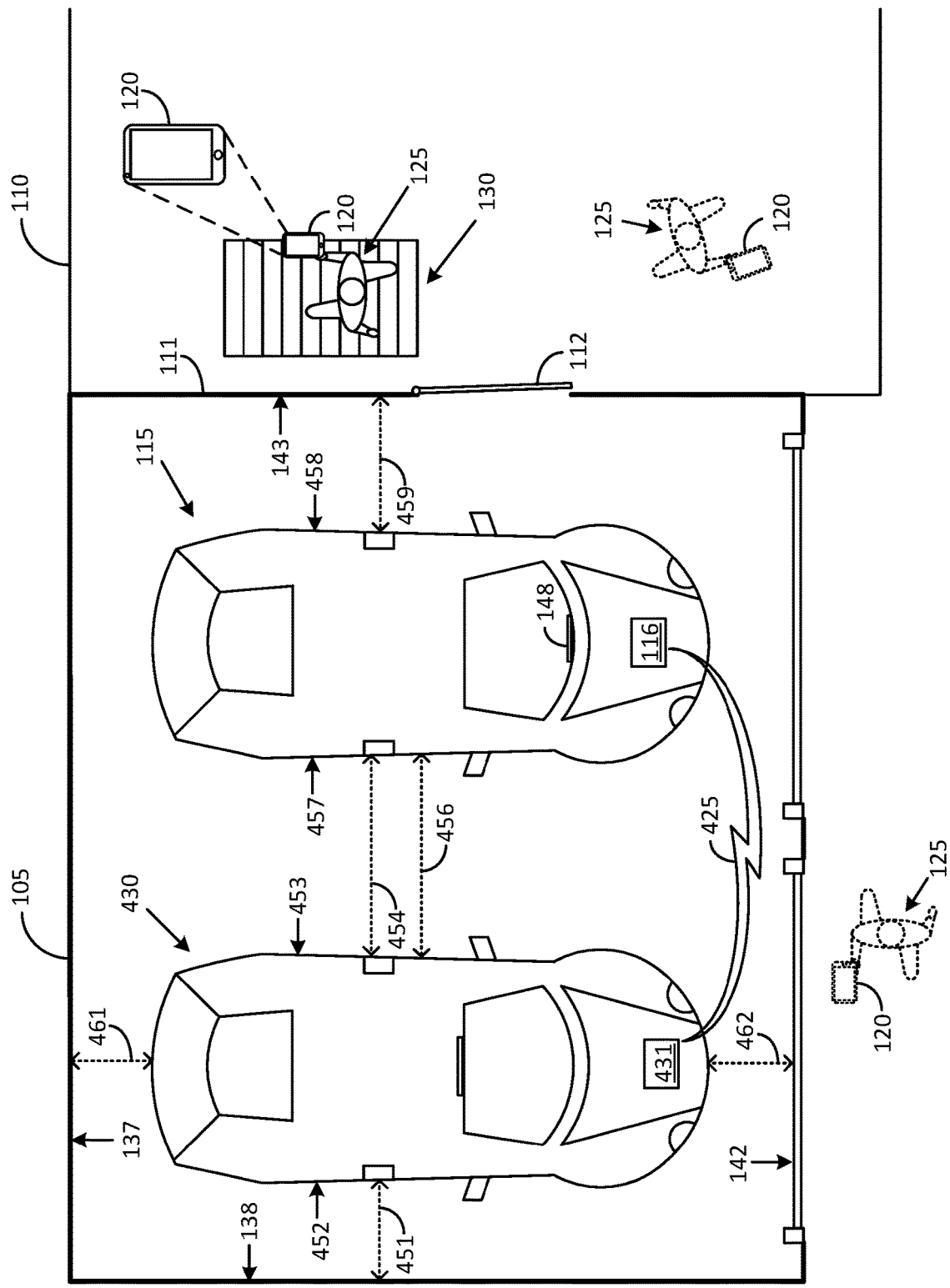
FIG. 4 illustrates a fourth example scenario where a vehicle that is parked in a garage executes some operations in accordance with the disclosure.

FIG. 4 illustrates a fourth example scenario where the vehicle 115 is parked in a fourth type of garage and executes some operations in accordance with the disclosure. The fourth type of garage is a two-vehicle garage in which another vehicle 430 is parked next to the vehicle 115. In a first example scenario, the vehicle 430 is equipped with a vehicle entry authorization system 431 that includes a communication system employing vehicle-to-vehicle (V2V) communications. The vehicle entry authorization system 431 of the vehicle 430 may communicate with the vehicle entry authorization system 116 of the vehicle 115 via a V2V communication link 425. The vehicle 430 may be a newly acquired vehicle that is being parked in the garage 105 for the first time and has no data pertaining to the garage 105. Consequently, the vehicle entry authorization system 431 of the vehicle 430 may request and obtain from the vehicle entry authorization system 116 of the vehicle 115, dimensional information about the interior portion of the garage 105, in the form of a template, for example. The template may be used by the vehicle entry authorization system 431 of the vehicle 430 to execute various operations in accordance with disclosure. Such operations can include refraining from automatically activating a component of the vehicle 430 (light, door, etc.) when the individual 125 is located outside the garage 105 (such as shown by the dashed line representations of the individual 125). The dimensional information may be further used by the vehicle entry authorization system 431 to perform desirable actions when the individual 125 is inside the garage 105 and intends to enter the vehicle 115.

In another example scenario, the vehicle 115 may be an autonomous vehicle and the vehicle entry authorization system 431 of the vehicle 430 may communicate with the vehicle entry authorization system 116 of the vehicle 115 via the V2V communication link 425 to instruct the vehicle 115 to pull out of the garage 105 so as to allow the vehicle entry authorization system 431 of the vehicle 430 to perform a measurement procedure. The vehicle entry authorization system 431 of the vehicle 430 may execute a measurement procedure to obtain dimensional information of the interior portion of the garage 105 after the vehicle 115 has pulled out of the garage 105. Upon completion of the measurement procedure, the vehicle entry authorization system 431 of the vehicle 430 may instruct the vehicle entry authorization system 116 of the vehicle 115 to move the vehicle 115 back into the garage 105.

In yet another example scenario, the vehicle entry authorization system 431 of the newly-acquired vehicle 430 may seek the assistance of the vehicle entry authorization system 116 of the vehicle 115 to execute a measurement procedure for obtaining dimensional information of the interior portion of the garage 105. The measurement procedure involves the vehicle entry authorization system 116 of the vehicle 115 capturing a first image of the wall 143 and obtaining a distance measurement of the distance 459 that extends from the wall 143 to a first side 458 of the vehicle 115 (the driver side of the vehicle 115). The first image can be annotated with the distance 459.

The vehicle entry authorization system 116 of the vehicle 115 may then capture a second image of a side 453 of the vehicle 430 (the driver side of the vehicle 430) and execute a distance measurement to determine the distance 456 that extends from the side 457 of the vehicle 115 to the side 453 of the vehicle 430. The second image can be annotated with the distance 456. The annotated first image and the annotated second image may then be stored in a database of the vehicle entry authorization system 116 of the vehicle 115. In an example implementation, location information of the vehicle 115 (GPS coordinates, for example) can be stored along with the annotated first image and the annotated second image.

The measurement procedure further involves the vehicle entry authorization system 431 of the vehicle 430 capturing a first image of the wall 138 and obtaining a distance measurement of the distance 451 that extends from the wall 138 to a side 452 of the vehicle 430 (the passenger side of the vehicle 430). The first image can be annotated with the distance 451.

The vehicle entry authorization system 431 of the vehicle 430 may then capture a second image of the side 457 of the vehicle 115 (passenger side) and execute a distance measurement to determine the distance 454 that extends from the side 453 of the vehicle 430 to the side 457 of the vehicle 115. The second image can be annotated with the distance 454. The annotated first image and the annotated second image may be stored in a database of the vehicle entry authorization system 431 of the vehicle 430. In an example implementation, location information of the vehicle 430 (GPS coordinates, for example) can be stored along with the annotated first image and the annotated second image.

Subsequently, the vehicle entry authorization system 431 of the vehicle 430 may wirelessly communicate with the vehicle entry authorization system 116 of the vehicle 115 to request a data transfer of the annotated first image and the annotated second image stored in the database of the vehicle entry authorization system 116 of the vehicle 115 (and also the location information of the vehicle 115, if so desired). The vehicle entry authorization system 431 of the vehicle 430 determines a separation distance between the wall 138 and the wall 143 of the garage 105 by combining the distance 459, the distance 456 (or the distance 454), the distance 451, a width dimension of the vehicle 430, and a width dimension of the vehicle 115. The width dimensions can be obtained from various sources such as, for example, a manufacturer of each vehicle. In one case, an average of the distance 454 and the distance 456 may be used in lieu of using either the distance 454 or the distance 456. In this case, the average of the distance 454 and the distance 456 corresponds to the separation distance between the side 457 of the vehicle 115 and the side 453 of the vehicle 430.

The vehicle entry authorization system 431 of the vehicle 430 may further generate annotated images of the wall 137 and the wall 142 and combine the distance 461 and the distance 462 with length information of the vehicle 430 to determine a separation distance between the wall 137 and the wall 142 of the garage 105. The dimensions of the interior portion of the garage 105 may then be determined based on the separation distance between the wall 138 and the wall 143 of the garage 105 and the separation distance between the wall 137 and the wall 142 of the garage 105.

In an alternative approach, the vehicle entry authorization system 431 of the vehicle 430 may instruct the vehicle entry authorization system 116 of the vehicle 115 to display a message on the mobile device of the individual 125. The message may request the individual 125, who may be a driver of the vehicle 115 to move the vehicle 115 out of the garage 105 so as to allow the vehicle entry authorization system 431 of the vehicle 430 to perform a measurement procedure. The vehicle entry authorization system 431 of the vehicle 430 may execute a measurement procedure to obtain dimensional information of the interior portion of the garage 105 after the vehicle 115 has been pulled out of the garage 105. Upon completion of the measurement procedure, the vehicle entry authorization system 431 of the vehicle 430 may instruct the vehicle entry authorization system 116 of the vehicle 115 to display a message to inform the driver that the vehicle 115 can be moved back into the garage 105.

In yet another alternative approach, the vehicle entry authorization system 431 of the vehicle 430 may instruct the vehicle entry authorization system 116 of the vehicle 115 to display a message on the GUI of the infotainment system 148 and/or on other devices such as, for example, a smart device carried by the individual 125. The message may request the individual 125 who can be an operator of the vehicle 115 (an autonomous vehicle) to authorize a Remote Park Assist Maneuver to autonomously open the door of the garage 105 and pull out of the garage 105 temporarily while the vehicle entry authorization system 431 of the vehicle 430 executes a measurement procedure to obtain dimensional information of the interior portion of the garage 105. Upon completion of the measurement procedure, the vehicle entry authorization system 431 of the vehicle 430 may instruct the vehicle entry authorization system 116 of the vehicle 115 to display another message on the GUI of the infotainment system 148 and/or on other devices such as, for example, a smart device carried by the individual 125. This message may request the individual 125 who can be an operator of the vehicle 115 to authorize the vehicle 115 to repark itself autonomously in the garage 105 and close the door of the garage 105.

In another example scenario, the vehicle 430 may be an older vehicle and lack communication facilities to communicate with the vehicle 115 via V2V communications. Consequently, the vehicle 430 may obtain the dimensional information about the interior portion of the garage 105 by executing a measurement procedure (such as the ones described above). Obtaining distance information between a passenger side of the vehicle 430 and the wall 143, where a line-of-sight view may be blocked by the vehicle 115, may be carried out in various ways. In one case, the measurement may be carried out when the vehicle 115 is not parked in the garage 105. In another case, the measurement may be carried out by obtaining vehicle data from a manufacturer's database via wireless communications through the Internet, for example. The vehicle data can pertain to, for example, a width of the chassis of the vehicle 115.

Figure 5:
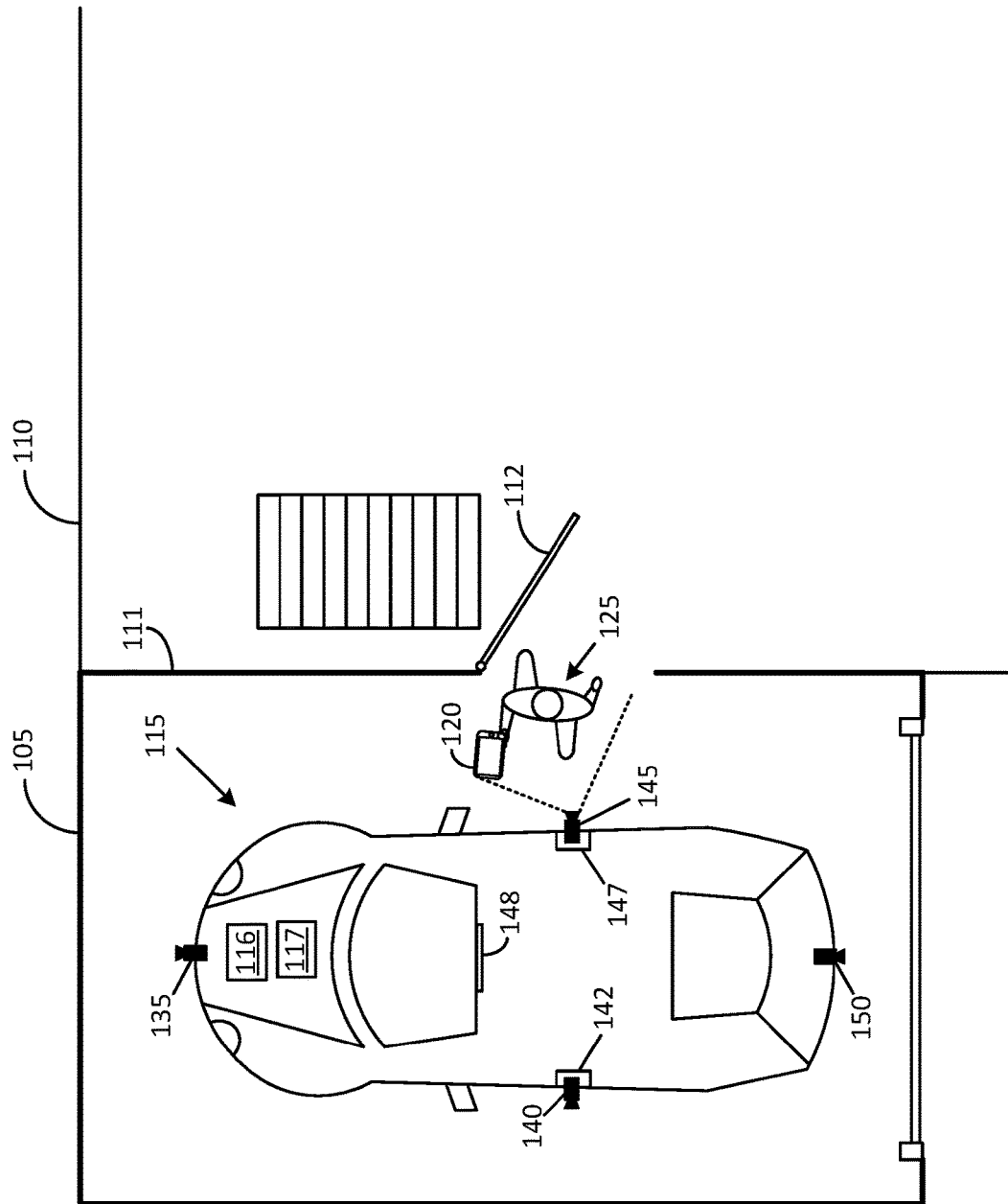
FIG. 5 illustrates a fifth example scenario where the vehicle shown in FIG. 1 executes some additional operations in accordance with the disclosure.

FIG. 5 illustrates a fifth example scenario where the vehicle 115 executes some additional operations in accordance the disclosure. In this scenario, the individual 125 is entering the garage 105 via the door 112. The vehicle entry authorization system 116 detects the location of the handheld remote-control device 120 and uses the dimensional information template to identify the presence of the individual 125 inside the garage 105. In one case, the vehicle entry authorization system 116 may activate the camera 145 to capture an image of the individual 125 and evaluate the image to confirm the presence and/or the identity of the individual 125. Upon confirming that the individual 125 is located inside the garage 105 and is walking towards the vehicle 115, the vehicle entry authorization system 116 may execute one or more autonomous operations such as, for example, unlocking and/or opening a door of the vehicle 115.

Figure 6:
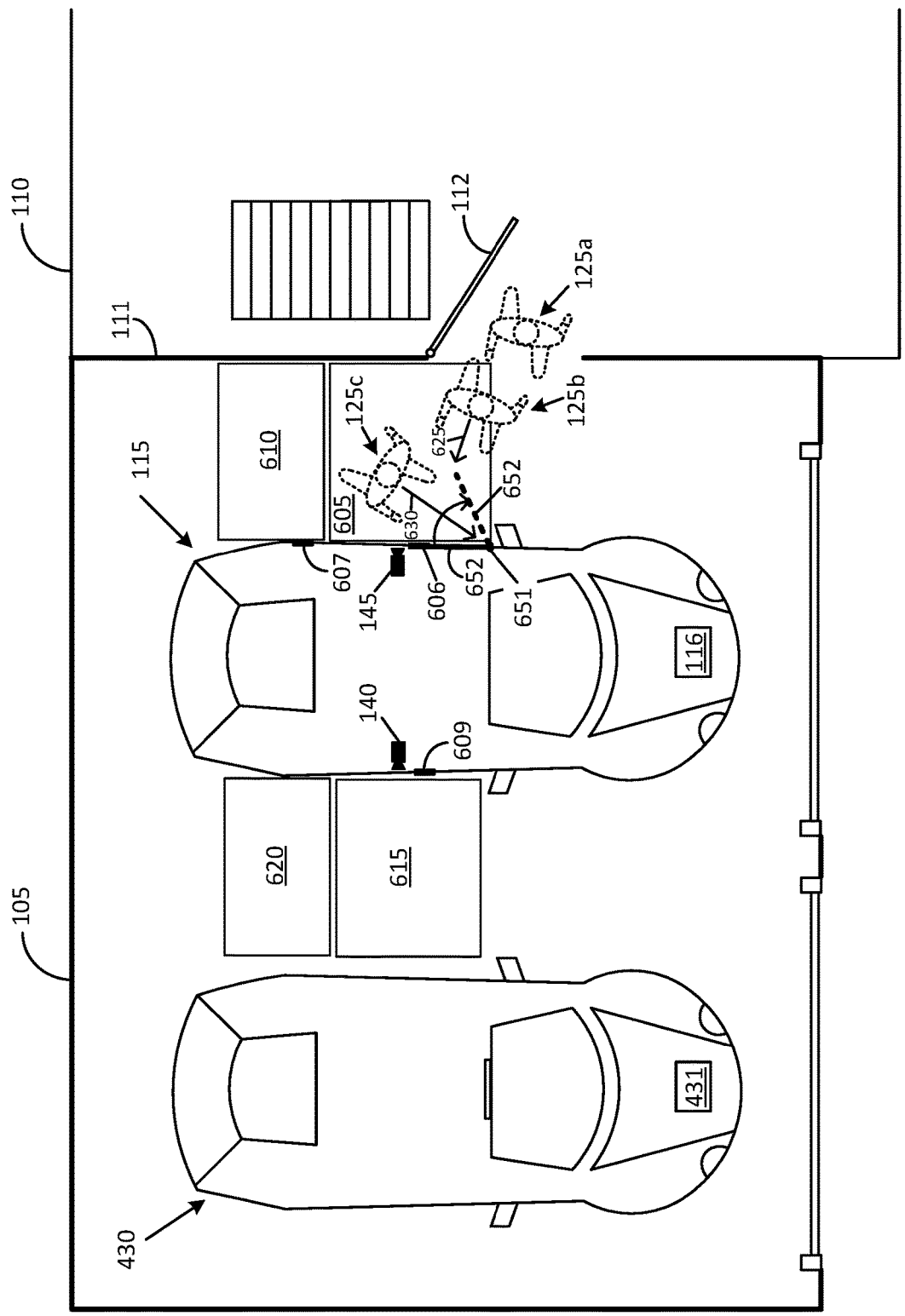
FIG. 6 illustrates a sixth example scenario where a vehicle that is parked in a garage executes some operations in accordance with the disclosure.

FIG. 6 illustrates a sixth example scenario where the vehicle 115 executes some additional operations in accordance the disclosure. In this scenario, the individual 125 is entering the garage 105 via the door 112. An example motion sequence of the individual 125 is illustrated by reference numerals 125a, 125b, and 125c. More particularly, reference numeral 125a corresponds to a first instant in time when the individual 125 is located at the threshold of the door 112. At this first instant in time, the vehicle entry authorization system 116 may or may not sense the presence of the individual 125. Sensing may be carried out by detecting the presence of a handheld remote-control device 120 (not shown) carried by the individual 125. Even if sensed, the vehicle entry authorization system 116 may not take any action because the individual 125 is located outside a first activation zone 605 and/or outside the garage 105, and it is unclear whether he/she intends to enter the vehicle 115.

The first activation zone 605 is an area that may be predefined with respect to the front driver side door 652 of the vehicle 115 and is located inside the perimeter of the interior portion of the garage 105. The predefining may be performed by any of various entities, such as, for example, a manufacturer of the vehicle 115 or by the individual 125. In this example scenario, the first activation zone 605 extends from the chassis of the vehicle 115 to the wall 111 of the garage. In another example scenario, such as, for example, when the garage is a large structure, the first activation zone 605 may extend outwards from the chassis of the vehicle 115 to a distance that falls short of the wall 111 (about 5 to 6 feet outwards from the vehicle 115, for example). In an example implementation, the first activation zone 605 encompasses an area where the individual 125 is likely to stand without hampering an opening of the front driver side door 652.

Reference numeral 125b corresponds to a second instant in time when the individual 125 has moved into the first activation zone 605. A sensor of the vehicle 115, such as, for example, an ultrasonic detector, may detect the presence of the individual 125 and propagate a detection signal to the vehicle entry authorization system 116. The vehicle entry authorization system 116 may respond to the detection signal by initiating a multifactor evaluation procedure to determine whether the individual 125 intends to enter the vehicle 115.

The multifactor evaluation procedure can include various operations such as, for example, identifying a direction of gaze of the individual 125, identifying an angular orientation of a torso portion of the individual 125, recognizing verbal commands based on voice recognition ("Open driver door," "Open rear driver side door," "Open front passenger side door," etc.), and/or recognizing gestures (pointing a finger towards a door of the vehicle 115, pointing an elbow towards a door of the vehicle 115, a chin movement towards a door of the vehicle 115, etc.).

In an example implementation of the multifactor evaluation procedure, the vehicle entry authorization system 116 activates the camera 145 to capture a first image of the individual 125 when the individual 125 is located in the first activation zone 605. Evaluation of the captured image may indicate to the vehicle entry authorization system 116 that a torso portion of the individual 125 is oriented at a first angle (as indicated by an arrow 625) with respect to the vehicle 115. The first angle may be any angle that provides an indication to the vehicle entry authorization system 116 that the individual 125 is moving towards the vehicle 115.

Upon receiving such an indication, the vehicle entry authorization system 116 may activate one or more components of the vehicle 115 such as, for example, the side lights, the hazard lights, and/or the cabin light. Activating such components can be interpreted as signs of welcome to the individual 125.

Reference numeral 125c corresponds to a third instant in time when the individual 125 continues to remain in the first activation zone 605. The vehicle entry authorization system 116 may activate the camera 145 for capturing a second image of the individual 125 and may evaluate the second image in order to identify an orientation of the torso portion of the individual 125 at this time and to confirm that the individual 125 is standing in the first activation zone 605.

In the illustrated scenario, the individual 125 is standing at a spot that may be typically used by the individual 125 in order to avoid hampering an opening of the front driver side door 652, prior to entry into the vehicle 115. More particularly, in this example scenario, the chest of the individual 125 is facing an anticipated opening in the front driver side door 652. The opening will be present when the vehicle entry authorization system 116 automatically opens the front driver side door 652 to allow the individual 125 to enter the vehicle 115. When the front driver side door 652 is open, the chest of the individual 125 who is standing in the first activation zone 605 will be facing a section of the vehicle 115 where the front driver side door 652 is attached to the chassis of the vehicle 115, such as, for example, the door hinge 651 of the front driver side door 652 (as indicated by an arrow 630).

The vehicle entry authorization system 116 may further evaluate the second image to determine a direction of gaze of the individual 125. More particularly, the vehicle entry authorization system 116 may evaluate the second image to determine whether the direction of gaze of the individual 125 is directed towards a door panel where the door handle 606 is located. Such a direction of gaze may indicate to the vehicle entry authorization system 116 that the individual 125 is intending to enter the vehicle 115.

The vehicle entry authorization system 116 may activate the camera 145 once again, after a time delay, for capturing a third image of the individual 125. The third image may be evaluated by the vehicle entry authorization system 116 to determine whether the direction of gaze of the individual 125 is being maintained persistently towards the door panel where the door handle 606 is located.

In an example implementation, the vehicle entry authorization system 116 ensures that the direction of gaze of the individual 125 is being maintained persistently for a predefined period of time (such as, for example, a period of time ranging from about 0.2 seconds to about 3 seconds). This operation can be carried out by ensuring that the third image of the individual 125 is captured within the predefined period of time after capture of the second image. In one case, the time delay between capture of the third image and the second image is arranged to be less than 2 seconds. One way to do so is to configure the camera 145 to capture a video clip at a frame rate of 30 frames per second (fps) or 60 fps, for example. Another way to do so is to configure the camera 145 to capture at least two digital images in less than 2 seconds.

The vehicle entry authorization system 116 may interpret a persistent maintenance of the direction of gaze towards the door panel where the door handle 606 is located as a confirmation that the individual 125 intends to enter the vehicle 115. Based on this interpretation, the vehicle entry authorization system 116 may activate one or more components of the vehicle 115 in order to carry out actions directed at allowing the individual 125 to enter the vehicle 115, such as, for example, unlocking the driver door and operating a door activation servomotor to swing open the driver door.

Activating the components of the vehicle 115 may be further based on other factors of the multifactor recognition procedure such as, for example, recognizing a verbal command issued by the individual 125, and/or recognizing a gesture made by the individual 125. Such factors can complement, supplement, or replace, factors such as determining the angle of the torso portion of the individual 125 and determining the direction of gaze of the individual 125.

In some situations, the individual 125 may be a passenger of the vehicle 115 and may be merely passing through the first activation zone 605 for getting into the vehicle 115 via the rear driver side door. In such a situation, the vehicle entry authorization system 116 may evaluate the first image and/or the second image and determine that the individual 125 is moving into a second activation zone 610 that is also located inside the perimeter of the interior portion of the garage 105. If so, the vehicle entry authorization system 116 may execute a multifactor evaluation procedure such as the example procedure described, for determining whether the individual 125 intends to enter the vehicle 115 via the rear driver side door. The multifactor evaluation procedure in this case, may include determining the direction of gaze of the individual 125 towards the door handle 607. A similar multifactor evaluation procedure may be performed by the vehicle entry authorization system 116 if the individual 125 continued to move on into the activation zone 620 for entry into the vehicle 115 through the rear passenger side door, or the activation zone 615 for entry into the vehicle 115 through the front passenger side door.

Figure 7:
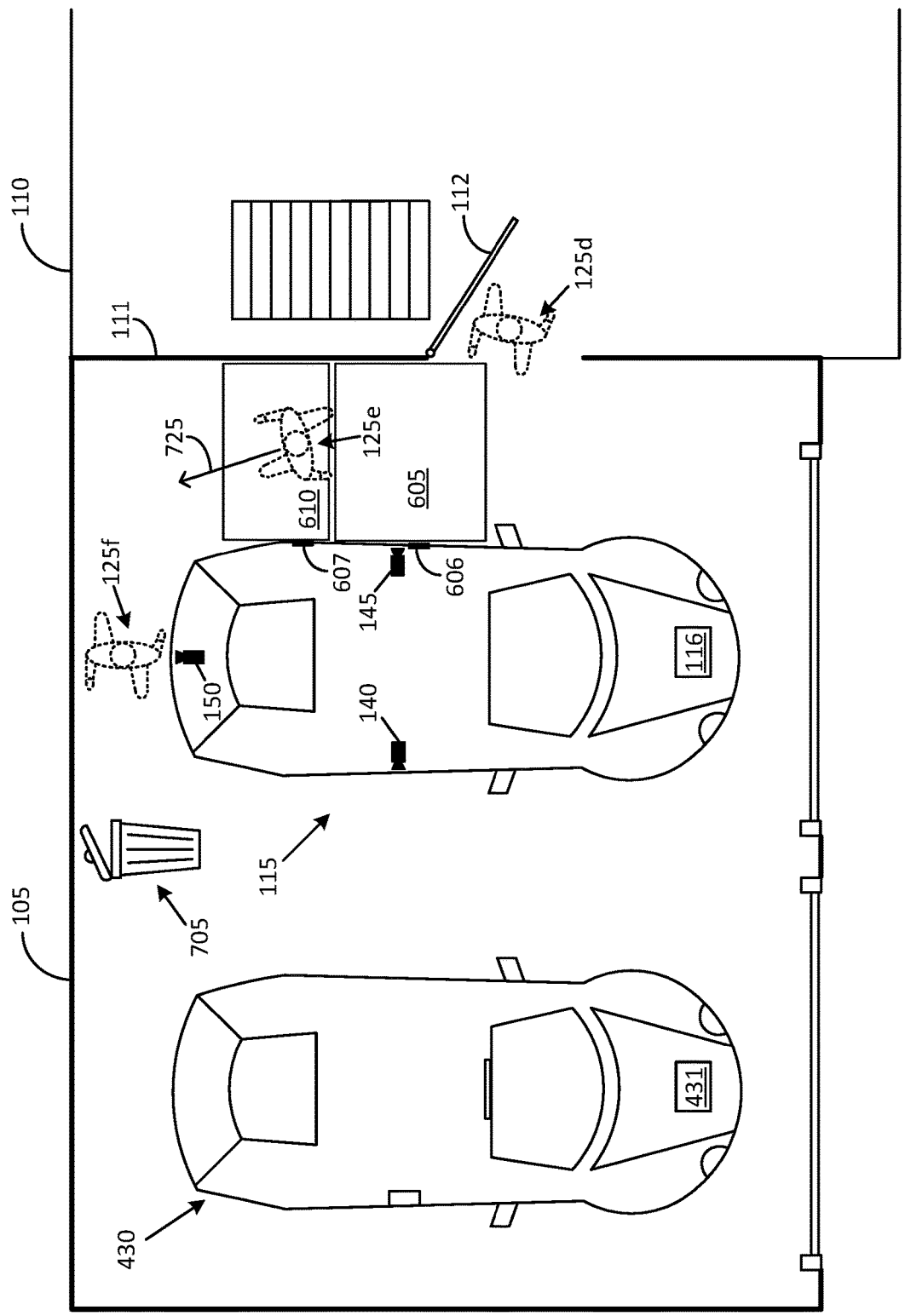
FIG. 7 illustrates a seventh example scenario where a vehicle that is parked in a garage executes some operations in accordance with the disclosure.

FIG. 7 illustrates a seventh example scenario where the vehicle 115 executes some additional operations in accordance the disclosure. In this scenario, the individual 125 is entering the garage 105 via the door 112. An example motion sequence of the individual 125 is illustrated by reference numerals 125d, 125e, and 125f. More particularly, the reference numeral 125d corresponds to a first instant in time when the individual 125 is located at the threshold of the door 112. At this time, the vehicle entry authorization system 116 may or may not sense the presence of the individual 125. Even if sensed, the vehicle entry authorization system 116 may not take any action because the individual 125 is located outside the first activation zone 605 and it is unclear whether he/she intends to enter the vehicle 115.

Reference numeral 125e corresponds to a second instant in time when the individual 125 has moved past the first activation zone 605 and into the second activation zone 610. At this second instant in time, the vehicle entry authorization system 116 senses the presence of the individual 125. For example, an ultrasonic detector may detect and propagate a detection signal to the vehicle entry authorization system 116. The vehicle entry authorization system 116 may respond to the detection signal by activating the camera 145 to capture one or more images and determine based on evaluating the image(s) that the individual 125 has walked past the first activation zone 605 and into the second activation zone. Furthermore, a torso portion of the individual 125 is oriented at an angle (indicated by an arrow 725) with respect to the vehicle 115. The angle may be any angle other than an angle that provides an indication to the vehicle entry authorization system 116 that the individual 125 is intending to enter the vehicle 115.

The vehicle entry authorization system 116 makes a determination based on the angle of the torso portion of the individual 125 and/or the movement of the individual 125 through the first activation zone 605 and into the second activation zone 610 that the individual 125 does not intend to enter the vehicle 115. Consequently, the vehicle entry authorization system 116 refrains from taking any action such as, for example, activating one or more lights of the vehicle 115 and/or opening a door of the vehicle 115.

The vehicle entry authorization system 116 may continue to sense the presence of the individual 125 near the vehicle 115 based for example, on receiving signals from one or more ultrasonic detectors mounted behind the rear panels of the vehicle 115. The presence of the individual 125 may be confirmed via one or more images captured by cameras such as the camera 145 and the camera 150. In this example scenario, the individual 125 is walking towards a trash container 705 in the garage 105 and does not intend to enter the vehicle 115. Detecting this lack of intent by the vehicle entry authorization system 116 and refraining from activating any component of the vehicle 115 offers several advantages such as, for example, eliminating unnecessary battery usage, eliminating a feature shutoff condition as a result of excessive false activations, and eliminating nuisance activity (automatically and unnecessarily turning on and/or flashing one or more lights of the vehicle 115 can be annoying to the individual 125).

Figure 8:
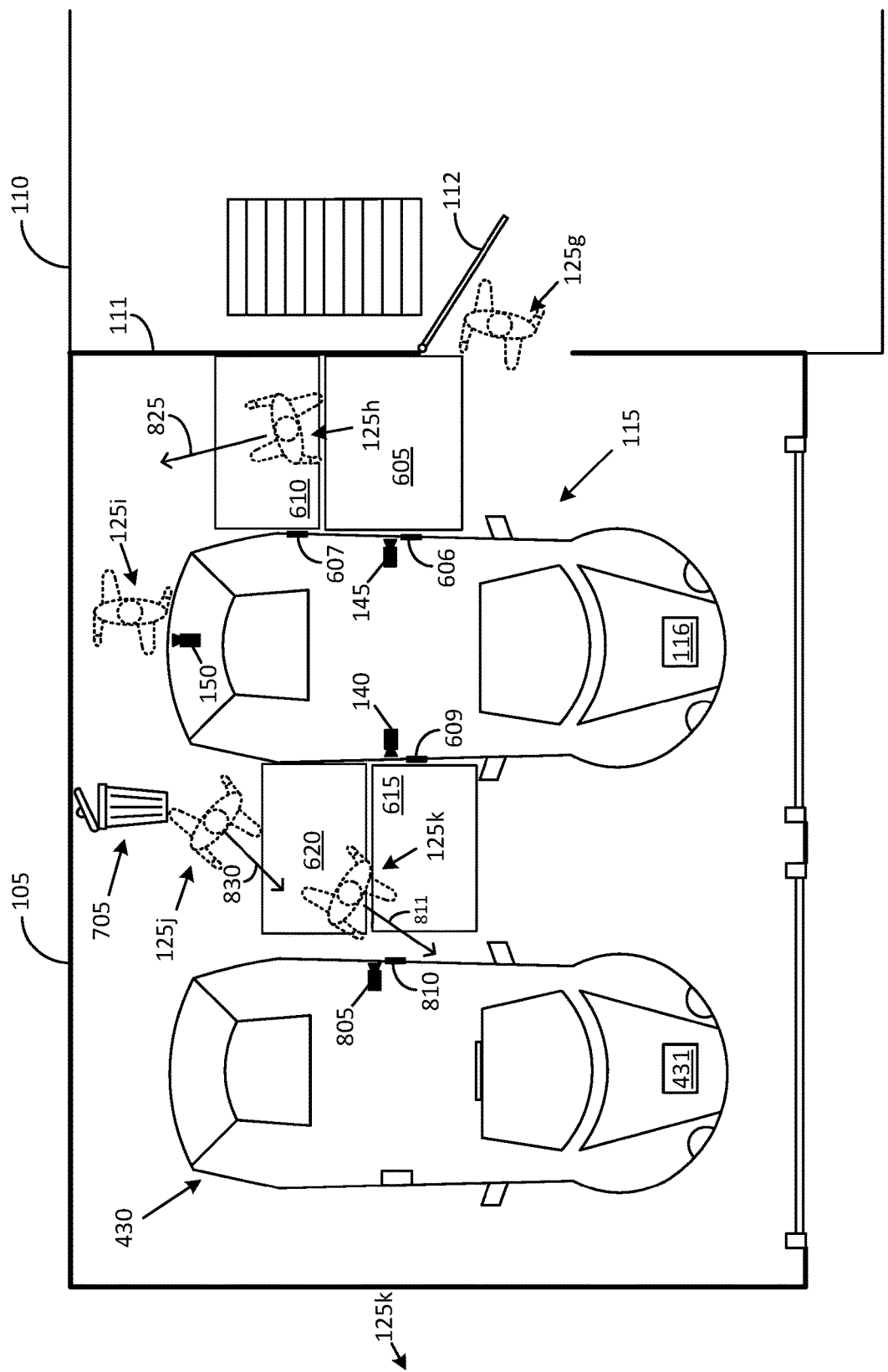
FIG. 8 illustrates an eighth example scenario where a vehicle that is parked in a garage executes some operations in accordance with the disclosure.

FIG. 8 illustrates an eighth example scenario where the vehicle 115 executes some additional operations in accordance the disclosure. In this scenario, the individual 125 is entering the garage 105 via the door 112. An example motion sequence of the individual 125 is illustrated by reference numerals 125g, 125h, 125i, 125j, and 125k. More particularly, reference numeral 125g corresponds to a first instant in time when the individual 125 is located at the threshold of the door 112. At this first instant in time, the vehicle entry authorization system 116 may or may not sense the presence of the individual 125. Even if sensed, the vehicle entry authorization system 116 may not take any action because it is unclear whether the individual 125 intends to enter the vehicle 115.

Reference numeral 125h corresponds to a second instant in time when the individual 125 has moved past the first activation zone 605 and into the second activation zone 610. At this second instant in time, the vehicle entry authorization system 116 senses the presence of the individual 125. For example, an ultrasonic detector may detect and propagate a detection signal to the vehicle entry authorization system 116. In an example implementation, the vehicle entry authorization system 116 may respond to the detection signal by activating the camera 145 for image capture and may evaluate a captured image to detect the individual 125 having walked past the first activation zone 605 and into the second activation zone. A torso portion of the individual 125 is oriented at an angle (indicated by an arrow 825) with respect to the vehicle 115. The angle may be any angle other than an angle that provides an indication to the vehicle entry authorization system 116 that the individual 125 is intending to enter the vehicle 115.

The vehicle entry authorization system 116 makes a determination based on the angle of the torso portion of the individual 125 and/or a direction of movement of the individual 125 through the first activation zone 605 and into the second activation zone 610 that the individual 125 does not intend to enter the vehicle 115. Consequently, the vehicle entry authorization system 116 refrains from taking any action such as, for example, activating one or more lights of the vehicle 115 and/or opening a door of the vehicle 115.

The vehicle entry authorization system 116 may continue to sense the presence of the individual 125 near the vehicle 115 based for example, on receiving signals from one or more ultrasonic detectors mounted behind the rear panels of the vehicle 115. The presence of the individual 125 may be confirmed via one or more images captured by cameras such as the camera 145, the camera 150, and the camera 140. In this example scenario, reference numeral 125*j* corresponds to an instant in time when the individual 125 is walking past the trash container 705 and towards an area between the vehicle 115 and the vehicle 430. At this time, the torso portion of the individual 125 is oriented at an angle (indicated by an arrow 830) with respect to the vehicle 115. The angle may be any angle other than an angle that provides an indication to the vehicle entry authorization system 116 that the individual 125 is intending to enter the vehicle 115.

The vehicle entry authorization system 116 makes a determination based on the angle of the torso portion of the individual 125 and/or a direction of movement of the individual 125 that the individual 125 does not intend to enter the vehicle 115. Consequently, the vehicle entry authorization system 116 refrains from taking any action such as, for example, activating one or more lights of the vehicle 115 and/or opening a door of the vehicle 115.

Reference numeral 125*k* corresponds to an instant in time when the individual 125 is facing away from the vehicle 115 and towards the vehicle 430 (indicated by an arrow 811). The vehicle entry authorization system 116 may activate the camera 140 to confirm, based on the angle of the torso portion of the individual 125, that the individual 125 does not intend to enter the vehicle 115. Consequently, the vehicle entry authorization system 116 refrains from taking any action such as, for example, activating one or more lights of the vehicle 115 and/or opening a door of the vehicle 115.

In this example scenario, the vehicle entry authorization system 431 of the vehicle 430 may make a determination that the individual 125 intends to enter the vehicle 430. The determination may be made on the basis of executing a multifactor evaluation procedure that can include evaluating one or more images captured by the camera 805 for identifying the angle of the torso portion of the individual 125 and maintaining a direction of gaze towards a door handle 810 of the vehicle 430.

If the direction of gaze of the individual 125 is being maintained towards the door handle 810 for at least a predefined period of time, the vehicle entry authorization system 431 may activate one or more components of the vehicle 430 for performing actions such as unlocking the front driver side door and operating a door activation servomotor to crack open the front driver side door. Such actions may be directed at permitting the individual 125 to enter the vehicle 430.

In another example scenario, the individual 125 may inadvertently face the door handle 609 of the vehicle 115 (and/or any of the other door handles of the vehicle 115 while moving around the vehicle 115) and the vehicle entry authorization system 116 of the vehicle 115 may erroneously conclude that the individual 125 intends to enter the vehicle 115. Consequently, the vehicle entry authorization system 116 may unlock a door of the vehicle 115 to allow the individual 125 to enter the vehicle 115. In accordance with an embodiment of the disclosure, the individual 125 may indicate to the vehicle entry authorization system 116 that he/she does not intend to enter the vehicle 115. The indication may be provided in various forms such as, for example, by a spoken command ("No!", for example), a gesture (a head shake or a wave of a hand), and/or an action (nudging the door).

In yet another example scenario, false activations performed by the vehicle entry authorization system 116 and/or the vehicle entry authorization system 431 may be minimized or eliminated by generating a movement template that is based on a movement pattern of the individual 125. An example movement template may be generated based on input provided to the vehicle entry authorization system 116 (and/or the vehicle entry authorization system 431) of a repetitive movement routine (daily, weekly, etc.) performed by the individual 125. An example repetitive movement routine can involve the individual 125 walking from the door 112 and around the vehicle 115 to get into the vehicle 430 for a daily commute to work. Another example repetitive movement routine can involve the individual 125 walking from the door 112 and around the vehicle 115 on a frequent basis to reach the trash container 705.

In an example implementation, the input may be provided to the vehicle entry authorization system 116 by the individual 125 in the form of a sketch that is provided by the individual 125 upon the GUI of the infotainment system 148. The sketch may be provided as an overlay upon a diagram that indicates the perimeter of the interior portion of the garage 105. In another example implementation, the input may be provided to the vehicle entry authorization system 116 in the form of a learning procedure. The learning procedure may include, for example, capturing of a video clip by one or more cameras of the vehicle 115 as the individual 125 walks along a path inside the garage 105 to reach the trash container 705 and/or the driver side door of the vehicle 430.

Figure 9:
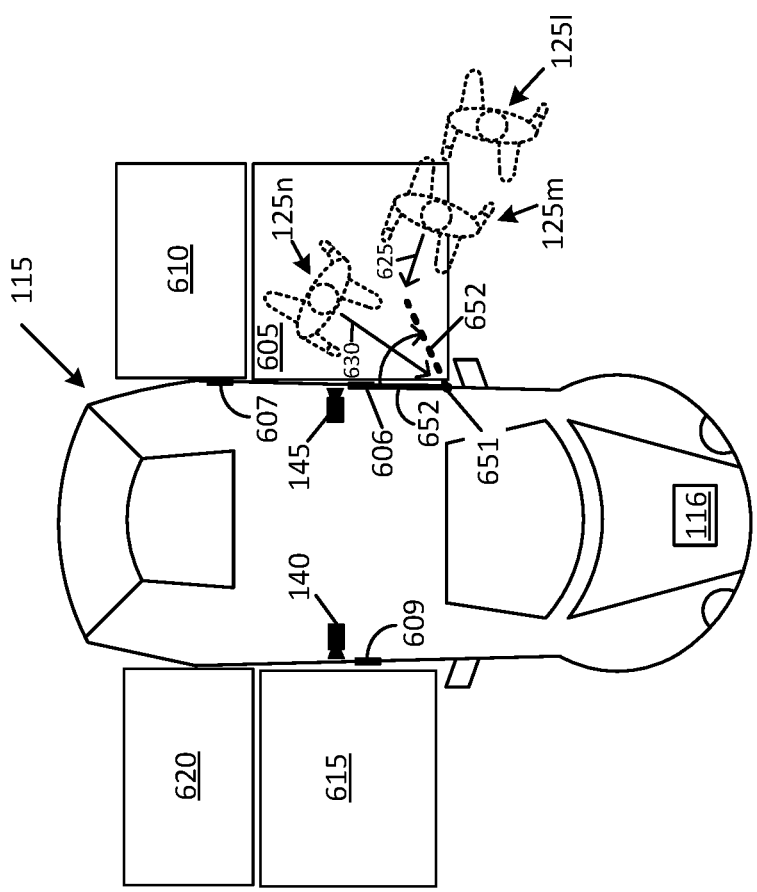
FIG. 9 illustrates a ninth example scenario where a parked vehicle executes some operations in accordance with the disclosure.

FIG. 9 illustrates a ninth example scenario where the vehicle 115 executes some additional operations in accordance the disclosure. In this scenario, the vehicle 115 is parked at a location outside the garage 105, such as, for example, on a driveway, on an exposed parking lot of a mall, or in a parking spot beside a curb on a road. The individual 125 is going through an example motion sequence that is illustrated by reference numerals 125*l*, 125*m*, and 125*n*. This example motion sequence is substantially similar to the motion sequence illustrated in FIG. 6 (reference numerals 125*a*, 125*b*, and 125*c*) and the description provided above with respect to the motion sequence illustrated in FIG. 6 is equally applicable to the motion sequence illustrated in FIG. 9, particularly with reference to the multifactor authentication procedure executed by the vehicle entry authorization system 116.

It must be understood that the description provided above with respect to the individual 125 walking around and behind the vehicle 115 is equally applicable to movements of the individual 125 in other directions such as, for example, in front of the vehicle 115, in front of the vehicle 430, and/or behind the vehicle 430.

It must also be understood that the description provided above with respect to the scenarios illustrated in FIG. 7 and FIG. 8 is equally applicable to scenarios where the vehicle 115 is parked outside the garage 105 either alone or beside one or more other vehicles (on one or both sides of the vehicle 115).

Figure 10:
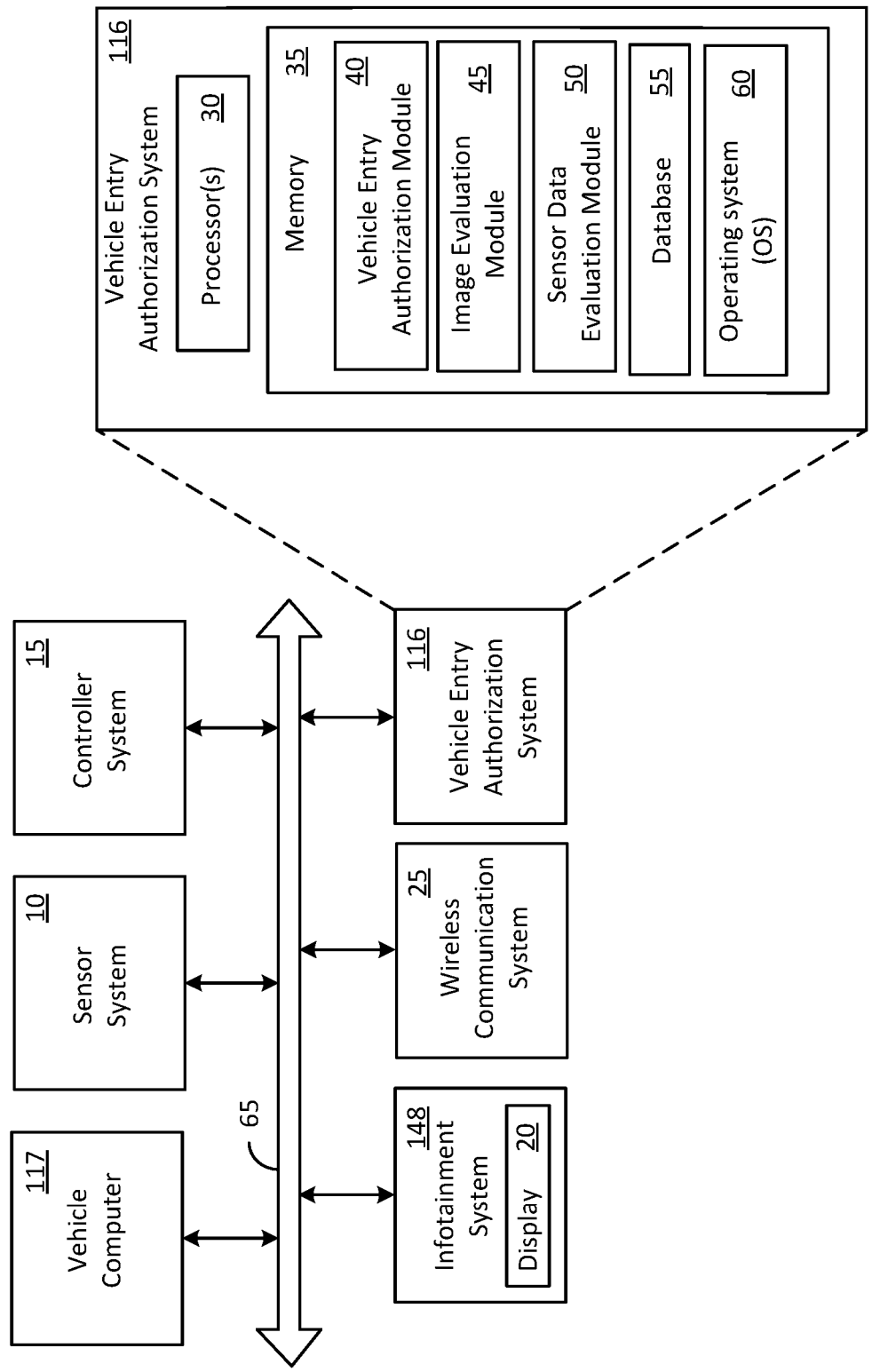
FIG. 10 shows some example components that may be included in a vehicle in accordance with an embodiment of the disclosure.

FIG. 10 shows some example components that may be included in the vehicle 115. The example components may include the vehicle computer 117, a sensor system 10, a controller system 15, the infotainment system 148, a wireless communication system 25, and the vehicle entry authorization system 116. The various components are communicatively coupled to each other via one or more buses such as an example bus 65. The bus 65 may be implemented using various wired and/or wireless technologies. For example, the bus 65 can be a vehicle bus that uses a controller area network (CAN) bus protocol, a Media Oriented Systems Transport (MOST) bus protocol, and/or a CAN flexible data (CAN-FD) bus protocol. Some or all portions of the bus 65 may also be implemented using wireless technologies such as Bluetooth®, Bluetooth® Low Energy, Ultra-Wideband, LF, UHF, Wi-Fi, Zigbee®, or near-field-communications (NFC).

The infotainment system 148 can include a display 20 having a GUI for carrying out various operations. The GUI may be used, for example, to allow the driver of the vehicle 115 to confirm the accuracy of a distance measurement procedure executed by the vehicle entry authorization system 116 and/or to provide input pertaining to a template associated with a movement routine of the individual inside the garage 105.

The sensor system 10 can include various types of sensors such as, for example, the camera 135, the camera 140, the camera 145, and the camera 150, and/or other sensors (not shown) such as, for example, an ultrasonic detector, a radar detector, a sonar detector, and a LIDAR device.

The controller system 15 can include various devices such as, for example, relay activation components, servomotor activation components, and light activation components, that can be operated under control of the vehicle entry authorization system 116 to perform actions such as unlocking a door of the vehicle 115, unlatching a door latch, cracking open a door of the vehicle 115, and turning on/off a light of the vehicle 115 (tail light, headlight, cabin dome light etc.). Some of such actions may be performed by the controller system 15 in cooperation with the vehicle computer 117.

The wireless communication system 25 can include multiple wireless nodes mounted at various locations on the vehicle 115 or a single integrated unit mounted for example, in an engine compartment of the vehicle 115, in a trunk of the vehicle 115, in a cabin of the vehicle 115, or on the roof of the vehicle 115. In an example implementation, the wireless communication system 25 is configured to allow the vehicle 115 to communicate with other vehicles using V2V communications.

The vehicle entry authorization system 116 may include a processor 30, and a memory 35. The memory 35, which is one example of a non-transitory computer-readable medium, may be used to store an operating system (OS) 60, a database 55, and various code modules such as a vehicle entry authorization module 40, an image evaluation module 45, and a sensor data evaluation module 50. The code modules are provided in the form of computer-executable instructions that can be executed by the processor 30 for performing various operations in accordance with the disclosure.

The vehicle entry authorization module 40 may be executed by the processor 30 for performing various operations related to executing measurement procedures for obtaining dimensional information of an interior portion of a garage and/or for executing a multifactor evaluation procedure. Obtaining dimensional information of the interior portion of the garage can include operating one or more components of the sensor system 10, converting the dimensional information, detecting the presence of a device such as, for example, a PaaK or a vehicle key fob, identifying a location of the device, and applying the template to determine whether the device is inside or outside the garage. If the device is located outside the garage, the vehicle entry authorization module 40 may cooperate with the controller system 15 and/or the vehicle computer 117 to ensure that no action is taken. However, if the device is located inside the garage, the vehicle entry authorization module 40 may cooperate with the controller system 15 and/or the vehicle computer 117 to automatically activate one or more components of the vehicle 115. Example components can be a door lock, a door latch, a door activation servomotor, or a light of the vehicle 115. The multifactor evaluation procedure may be executed to determine whether an individual who is located outside the vehicle 115 is intending to enter the vehicle 115.

The image evaluation module 45 may be executed by the processor 30 during execution of the vehicle entry authorization module 40, for evaluating images captured by one or more cameras of the sensor system 10. Evaluating such images can include identifying various objects in the images, such as, for example, a wall of the garage 105 and/or the individual 125.

The sensor data evaluation module 50 may be executed by the processor 30 during execution of the vehicle entry authorization module 40, for evaluating data received via sensor signals from various sensors of the sensor system 10. For example, the vehicle entry authorization module 40 may obtain a distance measurement from an ultrasonic device or a radar device of the sensor system 10. The distance information, which may correspond to a separation distance between the vehicle 115 and a wall of the garage 105, may be used to annotate the wall. The processor 30 may then combine the annotated wall with other annotated walls of the garage 105 to generate a template of the interior portion of the garage 105.

It must be understood that even though the various components in FIG. 6 are shown as discrete functional blocks, some of these components, or some parts of these components, may be combined together in some implementations in accordance with the disclosure. For example, in one example implementation, some or all parts of the vehicle entry authorization system 116 may be integrated with the vehicle computer 117.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, such as the processor 650 or the processor 30, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 35, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, electromagnetic, optical, and/or other types of storage media. In the context of this document, a "non-transitory computer-readable medium" can be, for example but not limited to, an electronic, electromagnetic, optical, electromagnetic, infrared, or semiconductor system, apparatus, or device. More specific examples (a non-exhaustive list) of the computer-readable medium would include the following: a portable computer diskette (electromagnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not in function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can,"

"could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method of operation of a vehicle entry authorization system of a vehicle, the method comprising:
    obtaining dimensional information of an interior portion of a garage in which the vehicle is parked;
    detecting a mobile device carried on an individual located outside the vehicle;
    determining, based on the dimensional information of the interior portion of the garage, that the mobile device is located inside the garage;
    executing, based on determining that the mobile device is located inside the garage, a multifactor evaluation procedure to determine whether the individual located outside the vehicle is intending to enter the vehicle, the multifactor evaluation procedure comprising:
        identifying a direction of gaze of the individual; and
        identifying an angular orientation of a torso portion of the individual; and
    automatically activating a component of the vehicle upon determining that the direction of gaze is towards a first door panel of a first door of the vehicle and that the torso portion of the individual is oriented at a first angle with respect to the vehicle.

2. The method of claim 1, wherein the mobile device is one of a smart device or a vehicle key fob, and wherein the component of the vehicle that is activated is at least one of a door lock, a door latch, a door activation motor, or a light.

3. The method of claim 1, wherein identifying the direction of gaze of the individual comprises:
    capturing an image of the individual; and
    evaluating the image to establish a line of sight extending from eyes of the individual to a first door handle.

4. The method of claim 3, further comprising:
    evaluating the image to establish that a chest of the individual is facing an opening through which the individual can enter the vehicle when the first door of the vehicle is opened.

5. The method of claim 4, further comprising:
    refraining from automatically activating the component of the vehicle upon determining that the chest of the individual is oriented at an angle other than facing the opening through which the individual can enter the vehicle.

6. The method of claim 3, further comprising:
    automatically activating the component of the vehicle subject to the individual maintaining the direction of gaze towards the first door handle of the first door over a first period of time.

7. The method of claim 6, wherein the first period of time is less than 3 seconds.

8. The method of claim 1, further comprising:
    receiving, subsequent to activating the component of the vehicle, at least one of a voice command, a gesture, or an action from the individual indicating that the individual did not intend to enter the vehicle.

9. A method of operation of a vehicle entry authorization system of a vehicle, the method comprising:
    obtaining dimensional information of an interior portion of a garage in which the vehicle is parked;
    capturing, at a first instant in time, a first image of an individual located outside the vehicle;
    evaluating the first image to identify a direction of gaze of the individual;
    determining that the direction of gaze is towards a first door panel of a first door of the vehicle;
    capturing, at a second instant in time, a second image of the individual based on determining that the direction of gaze at the first instant in time is towards the first door panel of the first door of the vehicle;
    determining that the direction of gaze is being maintained towards the first door panel of the first door of the vehicle;
    detecting a mobile device carried on the individual;
    determining, based on the dimensional information of the interior portion of the garage, that the mobile device is located inside the garage; and
    automatically activating a component of the vehicle in part upon determining that the direction of gaze of the individual is being maintained towards the first door panel of the first door of the vehicle and that the mobile device is located inside the garage.

10. The method of claim 9, wherein a time interval between capturing the first image and capturing the second image is less than 3 seconds.

11. The method of claim 9, further comprising:
    executing a multifactor evaluation procedure to determine whether the individual located outside the vehicle is intending to enter the vehicle, the multifactor evaluation procedure comprising:
    evaluating the first image and/or the second image to identify an angular orientation of a torso portion of the individual; and
    automatically activating the component of the vehicle upon determining that the direction of gaze is towards a first door handle of the first door of the vehicle and that the torso portion of the individual is oriented at a first angle with respect to the vehicle.

12. The method of claim 11, further comprising:
    refraining from automatically activating the component of the vehicle upon determining that the torso portion of the individual is oriented at an angle other than substantially perpendicular to the direction of gaze towards the first door handle of the first door of the vehicle.

13. The method of claim 9, wherein the mobile device is one of a smart device or a vehicle key fob, and wherein the component of the vehicle that is activated is at least one of a door lock, a door latch, a door activation motor, or a light.

14. A vehicle comprising:
    a sensor system;
    a controller system; and
    a vehicle entry authorization system comprising:
        a memory containing computer-executable instructions; and
        a processor configured to access the memory and execute the computer-executable instructions to perform operations comprising:
            obtaining dimensional information of an interior portion of a garage in which the vehicle is parked;
            detecting a mobile device carried on an individual located outside the vehicle:
            determining, based on the dimensional information of the interior portion of the garage, that the mobile device is located inside the garage; and
            executing, based on determining that the mobile device is located inside the garage, a multifactor evaluation procedure to determine whether the individual located outside the vehicle is intending to enter the vehicle, the multifactor evaluation procedure comprising:
  identifying a direction of gaze of the individual; and
  identifying an angular orientation of a torso portion of the individual; and
automatically activating a component of the vehicle upon determining that the direction of gaze is towards a first door panel of a first door of the vehicle and that the torso portion of the individual is oriented at a first angle with respect to the vehicle.

15. The vehicle of claim 14, wherein the mobile device is one of a smart device or a vehicle key fob, and wherein the component of the vehicle that is activated is at least one of a door lock, a door latch, a door activation motor, or a light.

16. The vehicle of claim 14, wherein identifying the direction of gaze of the individual comprises:
  capturing an image of the individual; and
  evaluating the image to establish a line of sight extending from eyes of the individual to a first door handle of the first door of the vehicle.

17. The vehicle of claim 16, further comprising:
  automatically activating the component of the vehicle subject to the individual maintaining the direction of gaze towards the first door handle of the first door over a first period of time.

18. The vehicle of claim 17, wherein the first period of time is less than 3 seconds.

* * * * *